United States Patent
Berthelot

(10) Patent No.: US 12,488,112 B2
(45) Date of Patent: Dec. 2, 2025

(54) NON-VOLATILE MEMORY WITH ACCESS CONTROL CIRCUIT FOR SECURE BOOT OF AN ELECTRONIC DEVICE

(71) Applicant: STMicroelectronics (Grand Ouest) SAS, Le Mans (FR)

(72) Inventor: Vincent Berthelot, Saint Pavace (FR)

(73) Assignee: STMicroelectronics (Grand Ouest) SAS, Le Mans (FR)

( * ) Notice: Subject to any disclaimer, the term of this patent is extended or adjusted under 35 U.S.C. 154(b) by 249 days.

(21) Appl. No.: 18/320,731

(22) Filed: May 19, 2023

(65) Prior Publication Data
US 2023/0385420 A1  Nov. 30, 2023

(30) Foreign Application Priority Data
May 27, 2022  (FR) ...................... 2205096

(51) Int. Cl.
*G06F 21/57*  (2013.01)
*G06F 21/60*  (2013.01)

(52) U.S. Cl.
CPC .......... *G06F 21/575* (2013.01); *G06F 21/604* (2013.01); *G06F 2221/034* (2013.01)

(58) Field of Classification Search
CPC ........ G06F 21/52; G06F 21/79; G06F 21/575; G06F 21/604; G06F 2221/034; G11C 16/20; G11C 16/22; G11C 7/20; G11C 7/24
See application file for complete search history.

(56) References Cited

U.S. PATENT DOCUMENTS

| | | | | |
|---|---|---|---|---|
| 6,711,675 B1 * | 3/2004 | Spiegel | ................. | G06F 9/4401 726/16 |
| 11,199,980 B2 * | 12/2021 | Brannock | ............. | G06F 3/0622 |
| 2002/0169979 A1 * | 11/2002 | Zimmer | ................ | G06F 9/4401 707/999.009 |
| 2004/0010702 A1 * | 1/2004 | Lewis | ................. | G06F 12/1433 711/E12.1 |
| 2004/0158698 A1 * | 8/2004 | Rothman | ............... | G06F 9/4401 713/1 |
| 2007/0022243 A1 * | 1/2007 | Rudelic | ............... | G06F 12/1433 711/E12.1 |
| 2007/0226478 A1 * | 9/2007 | Rudelic | ............... | G06F 12/1408 713/1 |
| 2009/0094421 A1 | 4/2009 | Lewis | | |
| 2010/0146231 A1 * | 6/2010 | Gopalan | ............. | G06F 11/1458 711/E12.103 |
| 2011/0004721 A1 * | 1/2011 | Smith | ................... | G06F 21/575 711/E12.008 |
| 2014/0006692 A1 * | 1/2014 | Berntsen | ................. | G06F 21/77 711/103 |

(Continued)

*Primary Examiner* — Michael Simitoski
(74) *Attorney, Agent, or Firm* — Slater Matsil LLP

(57) ABSTRACT

In an embodiment a method includes executing, during a first phase, one or more first codes stored in a first immutable zone of a non-volatile memory of an electronic device, forbidding, by an access control circuit of the non-volatile memory, execution of any codes stored in a second zone of the non-volatile memory during the first phase, executing, during a second phase, one or more second codes stored in the second zone and forbidding, by the access control circuit, any access to the first zone during the second phase.

20 Claims, 4 Drawing Sheets

(56) References Cited

U.S. PATENT DOCUMENTS

| | | | |
|---|---|---|---|
| 2014/0359788 A1* | 12/2014 | Laine | G06F 21/14 |
| | | | 726/27 |
| 2015/0371046 A1* | 12/2015 | Chen | G06F 21/575 |
| | | | 713/2 |
| 2016/0283313 A1* | 9/2016 | Robertson | G06F 3/0629 |
| 2020/0110713 A1* | 4/2020 | Daineche | G06F 21/6218 |
| 2021/0142836 A1* | 5/2021 | Kurokawa | G11C 11/1673 |
| 2021/0232337 A1* | 7/2021 | Talvitie | G06F 3/0655 |
| 2021/0264048 A1* | 8/2021 | Holopainen | G06F 13/16 |

* cited by examiner

NON-VOLATILE MEMORY WITH ACCESS CONTROL CIRCUIT FOR SECURE BOOT OF AN ELECTRONIC DEVICE

CROSS-REFERENCE TO RELATED APPLICATIONS

This application claims priority to French Application No. 2205096, filed on May 27, 2022, which application is hereby incorporated herein by reference.

TECHNICAL FIELD

The present disclosure refers to methods and devices for the security of electronic circuits, and in particular to devices and methods enabling to achieve a secure booting of such circuits.

BACKGROUND

The booting of an electronic device is based on the execution of codes such as software and/or firmware codes. The boot sequence of a device is an important step and only authentic codes and/or software must be used.

It is desirable to prevent an attacker of the device from introducing malicious codes and/or software into the device and to execute them during the boot sequence. However, existing solutions are often inefficient in this regard.

SUMMARY

Embodiments provide improvements of the safety of boot procedures and more particularly improvements of protection against attacks aiming at having malicious boot codes executed.

An embodiment overcomes all or part of the disadvantages of known processing devices.

An embodiment provides a method of booting an electronic device comprising:
 a first phase during which one or more first codes stored in a first immutable zone of a non-volatile memory are executed, the non-volatile memory further comprising an access control circuit configured to forbid the execution of any codes stored in a second zone of the non-volatile memory during the first phase; and
 a second phase during which one or more second codes stored in the second zone are executed, the access control circuit being configured to forbid any access to the first zone as a whole during the second phase.

According to an embodiment, the first and second zones are defined by one or more addresses contained in a non-volatile register.

According to an embodiment, the passing from the first phase to the second phase is triggered by the storage of a reference value into a volatile register of the device.

According to an embodiment, the access control circuit is further configured to read the content of the volatile register and to forbid any access to the first zone as a whole based on the reference value and to forbid the execution of any codes stored in the second zone based on a value different from the reference value.

According to an embodiment, the access control circuit is further configured to authorize the reading from and the writing into the second zone of the non-volatile memory zone during the first phase.

According to an embodiment, the storage of the reference value into the volatile register of the device is caused by the execution of a third code stored in the non-volatile memory.

According to an embodiment, the third code is stored in the first zone of the non-volatile memory.

According to an embodiment, the third code is stored in a third zone of the non-volatile memory.

According to an embodiment, the circuit for controlling the access to the non-volatile memory is configured to authorize the access for reading and execution of the codes contained in the third zone and to always forbid the access for writing into the third zone during the first and the second phases.

According to an embodiment, the first codes stored in the first zone are boot codes of the device.

According to an embodiment, the second codes stored in the second zone are application codes.

An embodiment provides a non-volatile memory of an electronic device comprising an access control circuit, the access control circuit being configured to:
 during a first phase during which one or more first codes stored in a first zone of the non-volatile memory are executed, forbid the execution of any codes stored in a second zone of the non-volatile memory; and
 during a second phase during which one or more second codes stored in the second zone are executed, forbid any access to the first zone as a whole.

According to an embodiment, the above memory comprises a non-volatile register, the first and second zones being defined by one or more addresses contained in the non-volatile register.

An embodiment provides an electronic device comprising the above non-volatile memory, and a volatile register, wherein the passing from the first phase to the second phase is triggered by the storage of a reference value into the volatile register.

According to an embodiment, the access control circuit is further configured to read the content of the volatile register and to forbid any access to the first zone as a whole based on the reference value and to forbid the execution of any codes stored in the second zone based on a value different from the reference value.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the design of the processing devices is well known by those skilled in the art and certain elements have not been detailed in the following description.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
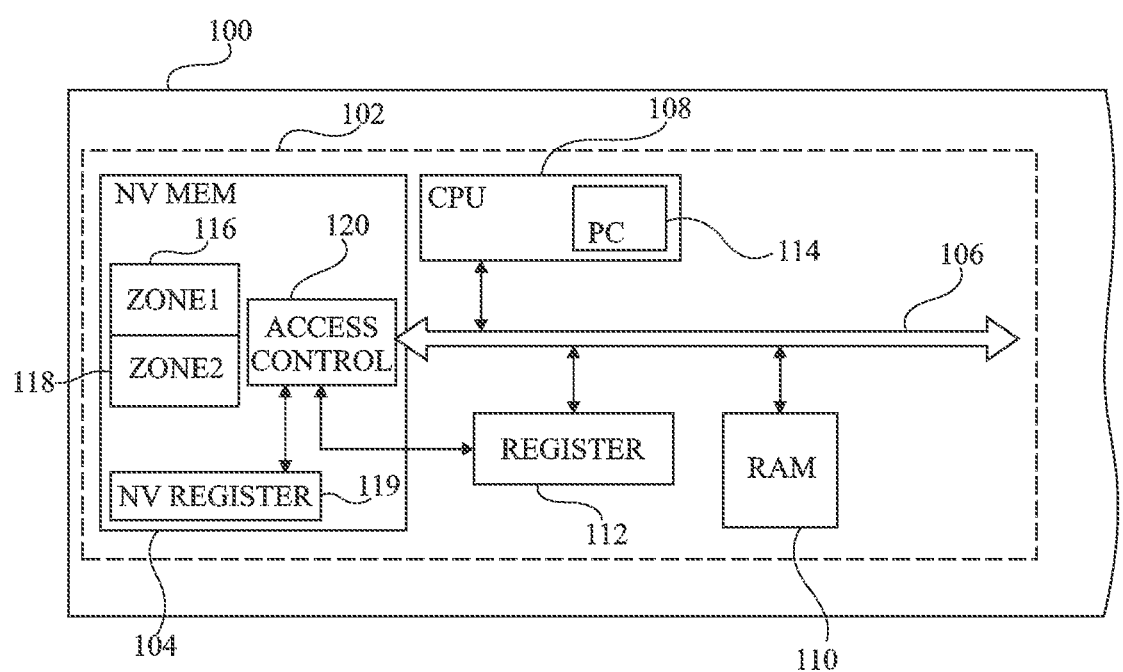
FIG. 1 schematically shows in the form of blocks an electronic device according to an embodiment of the present disclosure.

FIG. 1 very schematically shows in the form of blocks an electronic device wo comprising a processing device 102 according to an embodiment of the present disclosure.

Electronic device wo is for example an electronic board such as a microcircuit card, computer equipment, a microprocessor circuit, etc.

Processing device 102 for example comprises a non-volatile memory 104 (NV MEM), for example, a flash memory. Non-volatile memory 104 is coupled via a bus 106 to a generic processor 108 (CPU) and to a volatile memory no (RAM). Generic processor 108 comprises a program counter 114 (PC) containing for example the memory address of the instruction being executed by generic processor 108 or the memory address of the next instruction to be executed. The content of the counter is incremented on execution of the instruction and the instructions are executed sequentially by generic processor 108, according to the value of program counter 114.

Processing device 102 further comprises a register 112 (REGISTER).

Non-volatile memory 104 comprises a first zone 116 (ZONE1) having a plurality of codes, such as for example boot codes, and/or data stored therein, as well as a second zone 118 (ZONE2) having a plurality of other codes, such as for example application codes, and/or other data stored therein. The execution of the codes contained in zones 116 and 118 is coordinated by program counter 114. As an example, the content of zone 116 is immutable. In certain embodiments, non-volatile memory 104 further comprises a non-volatile register 119 (NV REGISTER).

In the described embodiments, the access to zones 116 and 118 is conditioned by an access control circuit 120 (ACCESS CONTROL). Access control circuit 120 is configured to forbid the execution of any codes stored in second zone 118 during a first phase, which is for example a boot phase of device 100. The boot phase of device 100 for example consists of the execution of one or more codes among the coeds stored in memory zone 116. For example, during a request to non-volatile memory 104, during the first phase, of access to a code for execution, access control circuit 120 is configured to determine whether the address of the code forms part of second zone 118, and if so, to forbid the access to this code. For example, access control circuit 120 is configured to compare the address of the code with a threshold address defining a frontier between zones 116, 118. If the address of the code is lower than the threshold address, the code is in zone 116 and the execution is authorized by access control circuit 120. If the address of the code is greater than the threshold address, the code is in zone 118 and the execution of this code is denied by access control circuit 120. For example, the threshold address is a last address of zone 116, and if the address of the code is equal to the threshold address, the access is authorized. In another example, the threshold address is a first address of zone 118, and if the address of the code is equal to the threshold address, the access is forbidden.

In the described embodiments, access control circuit 120 is further configured to forbid the access to first zone 116 as a whole during a second phase, which is for example an application phase of device 100. The application phase for example comprises the execution of one or more codes from among the codes stored in zone 118. For example, during a request, to non-volatile memory 104 and during the second phase, of access to a code for execution, access control circuit 120 is configured to determine whether the address of the code forms part of first zone 116, and if so, to forbid the access to this code. For example, access control circuit 120 is configured to compare the address of the code with the same threshold address mentioned hereabove. If the address of the code is lower than the threshold address, the code is in zone 116 and the access is forbidden by access control circuit 120. If the address of the code is greater than the threshold address, the code is in zone 118, and the access is authorized by access control circuit 120. For example, the threshold address is a last address of zone 116, and if the address of the code is equal to the threshold address, the access to the code is forbidden. In another example, the threshold address is a first address of zone 118, and if the address of the code is equal to the threshold address, the access is authorized.

According to an embodiment, the authorization and/or the denial of access to zones 116 and 118 by access control circuit 120 is conditioned by a value contained in register 112. For example, access control circuit 120 is coupled to register 112 to read a value stored in this register. Register 112 is for example implemented in volatile fashion.

As an example, when a reference value is stored in register 112, access control circuit 120 is configured to forbid any access to zone 116. For example, when register 112 is empty or contains a value different from the reference value, access control circuit 120 is configured to authorize the execution of the codes stored in zone 116 as well as the writing into and the reading from zone 118 and to forbid the execution of any codes stored in zone 118.

In certain cases, the threshold address, used by access control circuit 120 to distinguish addresses forming part of the first and second zones 116, 118 is a hard-coded value, which thus cannot be modified during the lifetime of device 100. In other examples, the threshold address is non-volatilely stored in non-volatile memory 104, but it is configurable. For example, access control circuit 120 is further coupled to non-volatile register 119 and non-volatile register 119 for example contains a value enabling to define the frontier between zones 116 and 118.

Figure 2:
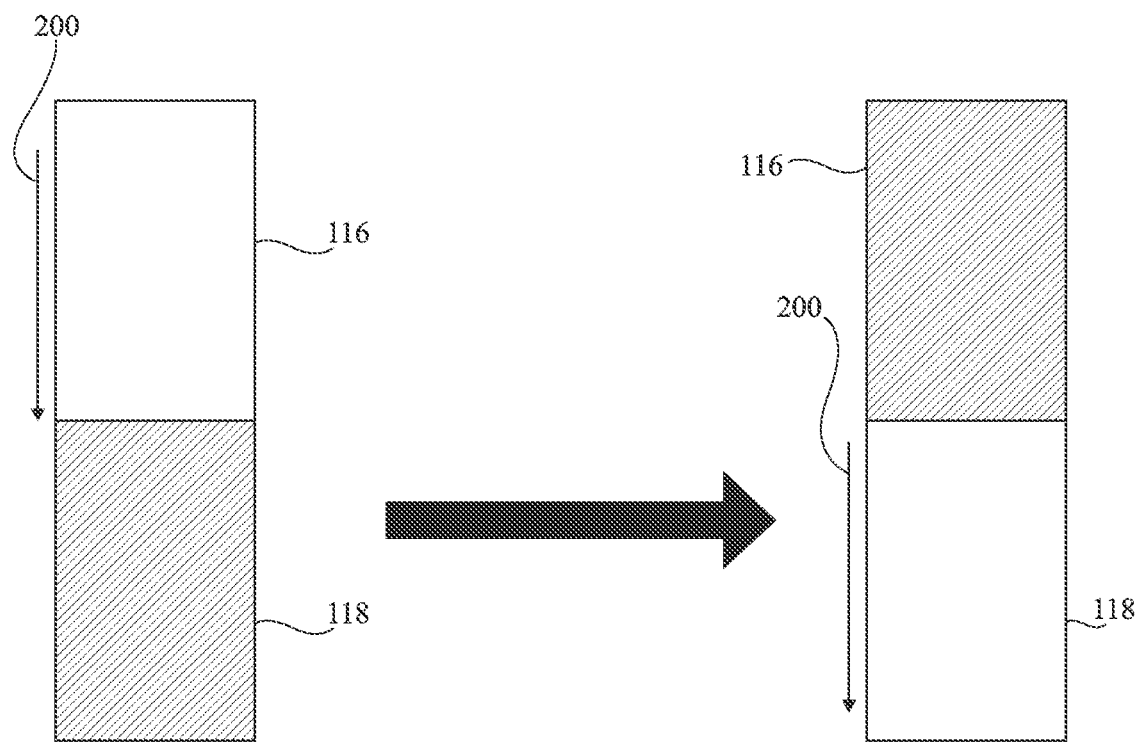
FIG. 2 illustrates memory zones accessible during and after the booting of the device of FIG. 1 according to an embodiment of the present disclosure.

FIG. 2 illustrates the memory zones accessible during the boot phase and during the application phase of device 100.

The areas shown as empty in FIG. 2 are the memory zones having their access for execution authorized by access control circuit 120 and the areas shown as full are the memory zones having their access for execution forbidden by access control circuit 120. Further, arrows 200 illustrated in FIG. 2 show the progression of the content of program counter 114? The progression of the value of program counter 114 illustrated in FIG. 2 does not necessarily reflect the physical order of the memory addresses at which the codes are stored in non-volatile memory 104. Indeed, two instructions executed one after the other according to the order of program counter 114 are not necessarily stored on two neighboring memory addresses of non-volatile memory 104, although this case is illustrated in FIG. 2 for clarity.

On the left-hand side of FIG. 2 is illustrated the state of non-volatile memory 104, and more particularly of the two memory zones 116 and 118 when electronic device 100 is in the boot phase.

During the boot phase, no value, or a value different from the reference value, is stored by default in register 112. Access control circuit 120 is then configured to authorize the access to zone 116. More particularly, access control circuit 120 authorizes the access for reading and execution of the data and/or codes stored in zone 116. For example, the writing into zone 116 is forbidden by access control circuit 120.

As an example, processor 108 controls, via bus 106, the execution of a code stored in zone 116. The memory address of the code is then transmitted to access control circuit 120. Since the reference value is not stored in register 112, access control circuit 120 authorizes the access for the execution of the code of zone 116.

As an example, an instruction to write into zone 118, for example an instruction to write a new application code, is coordinated by program counter 114. According to an embodiment, access control circuit 120 is configured to authorize the writing into and the reading from zone 118 when the reference value is not stored in register 112. In other words, when device 100 is in the boot phase. The writing of the new application code is then authorized by access control circuit 120. However, access control circuit 120 is configured to forbid the execution of codes, and accordingly of the new application code, stored in zone 118 when the reference value is not stored in register 112.

It is of course possible, in another embodiment, to further forbid the reading from and/or the writing into zone 118 when register 112 is empty or contains a value different from the reference value. An advantage of allowing the reading from zone 118 when register 112 is empty or contains a value different from the reference value is that this enables the code of zone 116 to read and authenticate the code stored in zone 118 on execution of the code of zone 116.

The storage of the reference value in register 112, and accordingly the passing from the boot phase to the application phase, is for example performed during the execution of a storage instruction stored in zone 116. For example, the storage instruction corresponds to a last instruction of the boot code and is executed when program counter 114 is incremented to a last value relative to the boot phase. The last instruction of the boot code is for example located at the very end of zone 116.

In another example, in the case where the frontier between zones 116, 118 is defined by a value in register 119, there is no storage instruction in the code, and instead of this, the storage of the reference value into register 112 is triggered, for example by control circuit 120, during the access to a last address of zone 116 defined by the value contained in register 119. For example, the threshold address stored in register 119 is a last address of zone 116, and if the address of the code at which the execution is requested is equal to the threshold address, access control circuit 120 is configured to store the reference value into register 112.

On the right-hand side of FIG. 2 is illustrated the state of non-volatile memory 104, and in particular of zones 116 and 118, during the application phase of device 100. The reference value being stored in register 112, access control circuit 120 is configured to forbid any access to zone 116 as a whole and to forbid the access for reading, writing, and execution to zone 118.

It is of course possible, in another embodiment, to only authorize the access for execution to zone 118 during the application phase.

Figure 3:
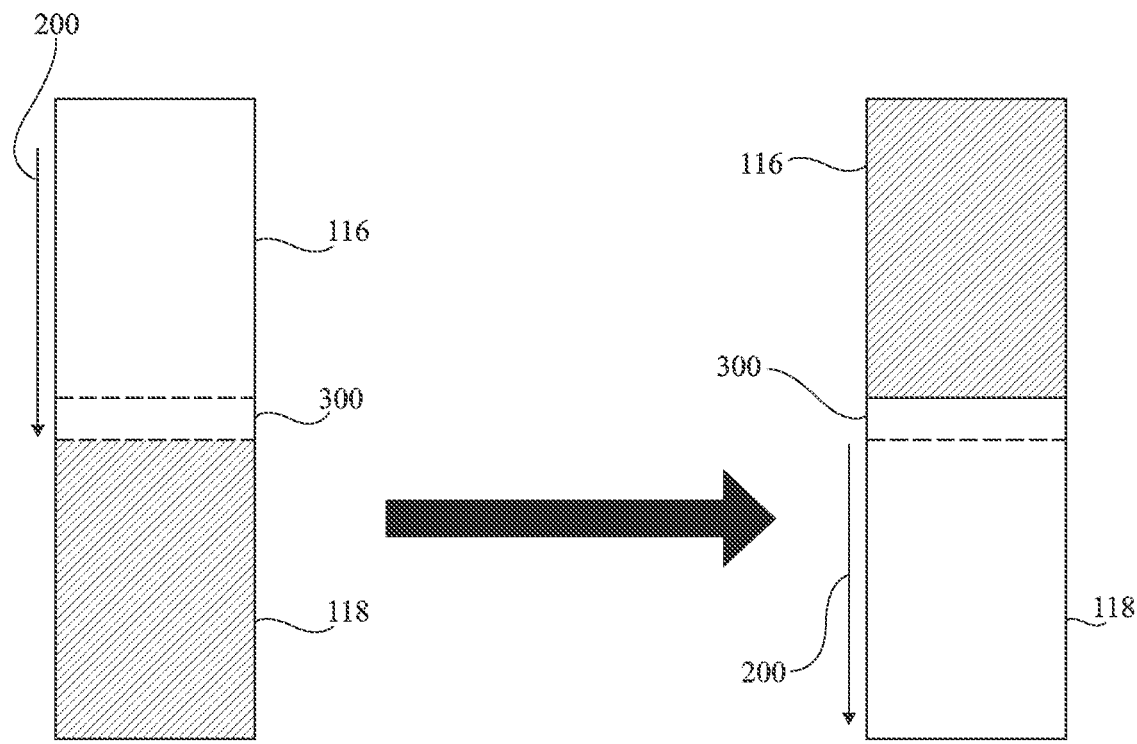
FIG. 3 illustrates memory zones accessible during and after the booting of the device of FIG. 1 according to another embodiment of the present disclosure.

FIG. 3 is similar to FIG. 2 but illustrates the memory zones accessible during the boot phase and during the application phase of device 100 according to another embodiment.

In the embodiment illustrated in FIG. 3, non-volatile memory 104 further comprises a gateway area 300 having the instruction of storage of the reference value into register 112 stored therein. Access control circuit 120 is then configured to always, that is, whatever the value contained in register 112, authorize the access for reading and execution to gateway area 300 and to always forbid the write access thereto. The implementation of gateway area 300 enables to avoid for processor 108 to be blocked when register 112 is updated, for example, when the reference value is being stored into register 112.

As an example, register 119 contains addresses forming the address range implementing the gateway zone. For example, register 119 contains a first threshold address defining the frontier between zone 116 and gateway zone 300 and a second threshold address defining the frontier between gateway zone 300 and zone 118. Register 119 then enables to set the size of each zone 116, 118 and of gateway zone 130.

Figure 4:
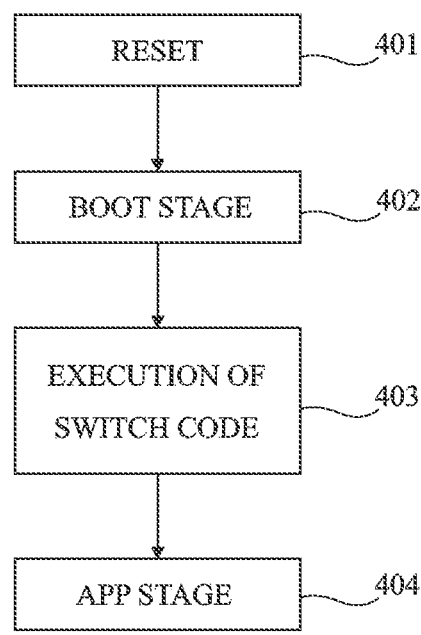
FIG. 4 is a flowchart showing operations of a method of secure booting of an electronic device according to an example of embodiment of the present disclosure.

FIG. 4 is a flowchart showing operations of a method of secure boot of an electronic device 100 according to an example of embodiment of the present disclosure.

In a step 401 (RESET), device 401 is turned on for a first time or is reset and device 100 enters the boot phase. Program counter 114 is initialized at an initial value, for example, zero. By default, no value, or a value different from the reference value, is stored in register 112. As an example, the reference value is predetermined on manufacturing of device 100 and is stored in non-volatile memory 104 or in another non-volatile memory of device 100. Access control circuit 120 is then configured to authorize the reading as well as the execution of the codes stored in zone 116 of non-volatile memory 104 and to forbid the execution of any codes stored in zone 118.

When non-volatile memory 104 further comprises gateway zone 300, access control circuit 120 is configured to authorize, as soon as step 401 is implemented, the reading and the execution of data and/or codes stored in zone 300. For example, in the case where gateway zone 300 is defined by values stored in register 119, access control circuit 120 is configured to always authorize the reading and the execution of data and/or codes stored between the two threshold addresses contained in register 119.

At a step 402 (BOOT STAGE), generic processor 108 executes, sequentially and according to the incrementations of program counter 114, the boot codes stored in zone 116. As an example, if an attacker succeeds in modifying the value of program counter 114 into a value corresponding to the memory address of an instruction stored in memory zone 118, access control circuit 120 will not give access to memory zone 118 for the execution of this code.

Step 402 ends, for example, when a last instruction of zone 116 is executed. In certain cases, this last instruction is the storage instruction. In an example, the storage instruction is located in the end of zone 116 so that after the storage execution, the value of program counter 114 corresponds to an instruction of zone 118. In another example, the storage instruction is located in gateway zone 300, and in this case, access control circuit 120 leaves access for reading and execution to zone 116 until the execution of the storage instruction. In another example, there is not storage instruction, and access control circuit 120 is configured to store the reference value into register 112 during a request for access to the last address of zone 116, or to an address in gateway zone 300, defined by one or more values contained in register 119.

At a step 403 (EXECUTION OF SWITCH CODE), subsequent to step 402, the reference value is stored in register 112. The storage of the reference value either caused by execution by processor 108 of the storage instruction, or caused by a request for access to the last address of zone 116, or to an address in gateway zone 300. After the reading of the reference value from register 112, access control circuit 120 is configured to forbid any access to zone 116 as a whole and to authorize the execution of the codes contained in zone 118.

As an example, when the memory further comprises gateway zone 300, access control circuit 120 is configured to authorize the reading and the execution of this zone even when the reference value is stored in register 112. Further, gateway zone 300 is for example immutable whatever the phase of device 100. In other words, whether or not the reference value is stored in register 112, access control circuit 120 is configured to forbid the writing into gateway zone 300.

At a step 404 (APP STAGE) subsequent to step 403, device 100 enters the application phase and the codes, for example, application codes, stored in zone 118 are executed by the processor. As an example, if after an error or an attack, the value of program counter 114 is modified to coordinate the execution of a boot code stored in zone 116, access control circuit 120 will forbid this operation.

Although FIG. 4 illustrates an example where zone 116 contains boot codes and where zone 118 contains application codes, the embodiments of the present disclosure may be implemented when the two zones 116 and 118 contain boot codes, for example to separate in two phases the boot sequence of device 100. It would also be possible for there to be one or more other zone, in addition to the two zones 116, 118, for which the access is controlled by access control circuit 120. For example, the one or more other zones contain boot codes and/or application codes.

An advantage of the described embodiments is that they prevent the execution of codes that may be malicious during the boot phase of device 100. Thus, any glitch-type attack comprising modifying program counter 114 to coordinate the execution of a code previously stored in zone 118 during the boot phase is thwarted by access control circuit 120.

Various embodiments and variants have been described. Those skilled in the art will understand that certain features of these various embodiments and variants may be combined, and other variants will occur to those skilled in the art.

Finally, the practical implementation of the described embodiments and variations is within the abilities of those skilled in the art based on the functional indications given hereabove. In particular, as concerns the location of register 112, it could form an integral part of non-volatile memory 104.

What is claimed is:

1. A method for operating an electronic device, the method comprising:
executing, during a first phase, one or more first codes stored in a first immutable zone of a non-volatile memory of the electronic device;
forbidding, by an access control circuit of the non-volatile memory, execution of any codes stored in a second zone of the non-volatile memory during the first phase;
executing, during a second phase, one or more second codes stored in the second zone;
forbidding, by the access control circuit, any access to the first zone during the second phase; and
authorizing, by the access control circuit, reading from and writing to the second zone during the first phase.

2. The method according to claim 1, wherein the first and second zones are defined by one or more addresses contained in a non-volatile register.

3. The method according to claim 2, wherein the non-volatile register is part of the non-volatile memory.

4. The method according to claim 1, further comprising transitioning from the first phase to the second phase by storing a reference value in a volatile register of the electronic device.

5. The method according to claim 4, wherein storing the reference value in the volatile register is caused by executing a third code stored in the non-volatile memory.

6. The method according to claim 5, wherein the third code is stored in the first zone of the non-volatile memory.

7. The method according to claim 5, wherein the third code is stored in a third zone of the non-volatile memory.

8. The method according to claim 1, further comprising:
reading, by the access control circuit, content stored in a volatile register;
forbidding, by the access control circuit, any access to the first zone based on a reference value; and
forbidding, by the access control circuit, execution of any codes stored in the second zone based on a value different from the reference value.

9. The method according to claim 1, wherein the first codes stored in the first zone are boot codes of the electronic device.

10. The method according to claim 1, wherein the second codes stored in the second zone are application codes.

11. A non-volatile memory comprising:
an access control circuit configured to:
execute, during a first phase, one or more first codes stored in a first zone of the non-volatile memory;
forbid, during the first phase, execution of any codes stored in a second zone of the non-volatile memory;
execute, during a second phase, one or more second codes stored in the second zone;
forbid, during the second phase, any access to the first zone; and
authorize reading from and writing to the second zone during the first phase.

12. The non-volatile memory according to claim 11, further comprising a non-volatile register, wherein the first and second zones are defined by one or more addresses contained in the non-volatile register.

13. An electronic device comprising:
the non-volatile memory according to claim 11; and
a volatile register, wherein the electronic device is configured to trigger passing from the first phase to the second phase by storing a reference value in the volatile register.

14. The electronic device according to claim 13, wherein the access control circuit is further configured to:
   read content stored in the volatile register;
   forbid any access to the first zone based on the reference value; and
   forbid execution of any codes stored in the second zone based on a value different from the reference value.

15. A method for operating an electronic device, the method comprising:
   executing, during a first phase, one or more first codes stored in a first immutable zone of a non-volatile memory of the electronic device;
   forbidding, by an access control circuit of the non-volatile memory, execution of any codes stored in a second zone of the non-volatile memory during the first phase;
   executing, during a second phase, one or more second codes stored in the second zone;
   forbidding, by the access control circuit, any access to the first zone during the second phase;
   authorizing, by the access control circuit, access for reading and executing codes contained in a third zone of the non-volatile memory; and
   always forbidding, by the access control circuit, access for writing in the third zone during the first and the second phases.

16. The method according to claim 15, wherein the first and second zones are defined by one or more addresses contained in a non-volatile register, and wherein the non-volatile register is part of the non-volatile memory.

17. The method according to claim 16, further comprising transitioning from the first phase to the second phase in response to detecting a predetermined reference value stored in a volatile register of the electronic device, wherein the access control circuit monitors the volatile register and changes access permissions upon detection of the predetermined reference value.

18. The method according to claim 17, wherein the reference value is stored in the volatile register by executing a third code stored in the non-volatile memory.

19. The method according to claim 18, wherein the third code is stored in the first zone of the non-volatile memory, or wherein the third code is stored in the third zone of the non-volatile memory.

20. The method according to claim 15, further comprising authorizing, by the access control circuit, reading from and writing to the second zone during the first phase.

* * * * *